United States Patent [19]

Haley et al.

[11] Patent Number: 5,155,706
[45] Date of Patent: Oct. 13, 1992

[54] AUTOMATIC FEATURE DETECTION AND SIDE SCAN SONAR OVERLAP NAVIGATION VIA SONAR IMAGE MATCHING

[75] Inventors: Paul H. Haley, Monroeville; James J. Oravec, Plum Borough, both of Pa.

[73] Assignee: Westinghouse Electric Corp., Pittsburgh, Pa.

[21] Appl. No.: 774,428

[22] Filed: Oct. 10, 1991

[51] Int. Cl.$^5$ .................................. G01S 15/00
[52] U.S. Cl. .......................... 367/7; 367/88; 367/11
[58] Field of Search ............. 367/7, 88, 11; 358/111, 358/112; 378/99

[56] References Cited

U.S. PATENT DOCUMENTS 4,868,651  9/1989  Chou et al. .................. 358/111
4,941,164  7/1990  Schuller et al. ............. 378/99

OTHER PUBLICATIONS

Phillip F. Schweizer and Walter J. Petlevich, "Automatic Target Detection and Cuing System for an Autonomous Underwater Vehicle (AUV)", Proceeding of Sixth Symposium on Unmanned, Untethered Submersibles, Oct. 1989.

Sanjay Ranade and Azriel Rosenfeld, "Point Pattern Matching by Relaxation", Patten Recognition, vol. 12, pp. 269-275 (Rergamon Press Ltd. 1980).

Primary Examiner—Daniel T. Pihulic
Attorney, Agent, or Firm—D. Schron

[57] ABSTRACT

A method of locating objects in sonar images so that matching algorithms can be used to determine if the same objects appear in two images. Information from the matching algorithms can then be used to upgrade the position of the vehicle and objects recorded in the vehicle's navigation system. Images are improved by normalizing brightness and contrast and then convolving the image with at least one filter. The image is normalized by dividing the image into vertical strips, creating a histogram to represent the grayness values for columns of pixels in each strip and applying an algorithm to each strip to change its grayness value.

19 Claims, 14 Drawing Sheets

AUTOMATIC FEATURE DETECTION AND SIDE SCAN SONAR OVERLAP NAVIGATION VIA SONAR IMAGE MATCHING

FIELD OF INVENTION

The invention relates to a method for matching sonar images via automatic object detection in order to implement side scan sonar overlap navigation.

BACKGROUND OF THE INVENTION

Sonar is a widely used method for determining the position of objects in the ocean. Sonar has been used for navigation and to find mines or other objects of interest on the ocean bottom. The location of objects on the ocean floor might cue an operator as to position of his vessel when he can compare the locations to a map of previously surveyed regions. Sonar scans may also reveal whether changes have occurred in the region. Also, one can develop symbolic feature maps for only data related to significant features identified by sonar. Unlike optical images, sonar images are very noisy. Thus, it is very difficult to identify objects, particularly small objects, in sonar images. Also, it is difficult to compare two sonar images to determine whether the images were taken at the same location. Some images have a very high information content while others are virtually flat or featureless. In some images subtle changes in texture are the only distinguishing feature. Another difficulty in analyzing sonar images results from the fact that the image is dependent upon the angle at which the sonar signal strikes an object. That angle, of course, is determined by the height of the sonar emitting vehicle from the ocean bottom and the distance the objects are from the source of the sonar signals. Objects which are close to the sonar source show very small shadows. Those shadows increase for objects as the distance from the sonar source increases. Thus, the sonar image of any particular object is dependent on both angle and distance from which the sonar signal is transmitted.

There is a need to compare sonar images to determine if they are both taken at the same location. This may be important for navigation or other purposes. After determining that two images had been taken at the same location, it may be important to know whether any changes have occurred in the position or number of objects present in one image as compared to a second image. Prior to the present invention, there has been no way to automatically compare the two images. Rather, trained, experienced technicians have made visual comparisons to determine if two prints or displays were taken of the same location. This process can take a great deal of time. Automatic detection systems developed for optical images do not work well for noisy sonar images. The noisy nature of sonar images often precludes the use of line and edge detection operators of the type used for video images. Pattern recognition techniques used on video images are not applicable to sonar images because the representation of objects on a sonar image is very dependent upon the distance and angle between the object and the source of the sonar. Thus, two images of the same object taken at a different distance and angle may appear to be quite different to the untrained eye. Connectivity analysis which has been used for video images cannot be used on noisy images such as those produced by sonar. Prior information about the scene is not available for sonar images so pattern recognition techniques cannot be used. Thus, there is a need for an automatic method of analyzing sonar images to identify objects in the image and to compare images for matching purposes.

An autonomous underwater vehicle requires an accurate navigational system for covert missions during which the vehicle cannot surface. Sonar has been used for obstacle avoidance while maneuvering but not for such navigation. This invention proposes side scan sonar for navigation.

Development of a side scan sonar overlap navigation system is complicated by the fact that objects which appear in the overlap region of one image may not be the same as objects appearing in the same overlap region on an adjacent pass. The discrepancy results from the fact that the return signal from bottom objects is direction and grazing angle dependent as well as the fact that sonar signals have a low signal-to-noise ratio which results in a somewhat random detection of objects. Nevertheless, objects in the overlap zone have a reasonable probability of being detected on both passes. There is a need for a method to correlate objects seen on one pass with objects seen on the next pass. Such a method should be able to tolerate missing objects. Such method would permit accurate navigation by overlapping and matching side scan sonar images.

SUMMARY OF THE INVENTION

We have developed a method for analyzing sonar images which involves the basic steps of normalizing the image, filtering the image and then displaying the normalized and filtered image. We may also apply a matching algorithm to the filtered and normalized image and a second image. The filtering process equalizes the contrast across the image. Because sonar images can be represented as raster images often containing 480 rows by 512 columns of pixels, one can digitize each pixel on a gray scale and then apply an algorithm to normalize the image. Then, one can convolve the image using filters. We prefer to use low pass filters having a generally round area. We further prefer to apply these filters in a sequence wherein the filter having the lowest area is applied first and subsequent filters having 2, 3 and 4 times the area of smallest low pass filter are used successively. We have found that the number of objects in an image will determine the best size filter to use. If the image has very few objects, one should use a smaller filter. If the image has a large number of objects, a larger filter is required. If one uses the wrong filter he may have either no objects detected or too many detections which leads to excessive matching computations.

We have found that four particular filters are useful in this process. Each filter will generate a certain number of false detections which we call false alarms depending on the conditions selected for normalizing the image. Through experience we have developed a chart of false alarm ranges which is shown in the figures. From this chart we can select the appropriate filter to be used for a particular image. In addition to the low pass filter, we also prefer to apply a spatial differentiation filter to combine the search for highlights and shadows in one step. This differentiation filter is a matrix comprised of one row and a number of columns which is equal to the number of columns in the low pass filter which has been applied to the image. After filtering objects in the image can be more reliably identified. Moreover, filtered images are well, suited for matching. We propose to match features detected twice within the common overlap regions of two adjacent sonar images and use state estimation to reduce navigation errors. By correcting both random and systematic errors in the navigation system, complete area coverage with no missed areas and without undue overlap is ensured. In particular, this capability is important for correcting drift errors associated with inertial navigations systems. Knowledge of navigation errors enables the vehicle's position and the positions of objects in the image to be estimated more accurately.

Other objects and advantages of the invention will become apparent as a description of certain present preferred embodiments of the invention proceeds.

DETAILED DESCRIPTION OF THE INVENTION

Figure 1:
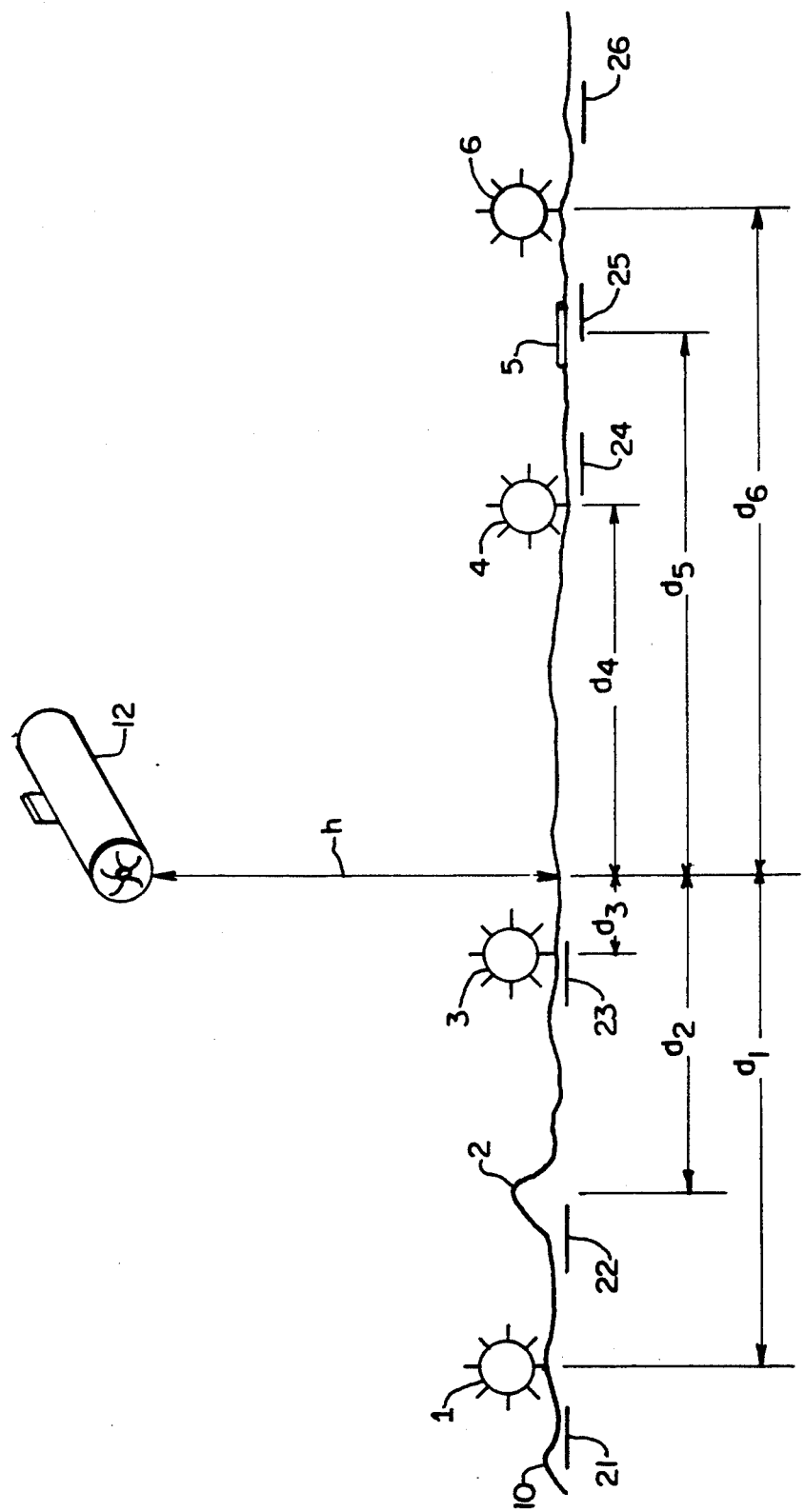
FIG. 1 is a diagram showing the dependency of a sonar image upon the position of the vehicle generating the sonar signal.

Referring to FIG. 1 we illustrate a sonar source 12 above an ocean bottom 10 having a series of objects 1 through 6 on the ocean floor. Objects 1, 3, 4 and 6 are mines of the same size. The vehicle 12 is at a known height h above the bottom floor. Objects 1 through 6 are at distances $d_1$ through $d_6$ respectively from directly below the vehicle. Assuming the vehicle emits sonar (sound, pressure) waves from its left side and then its right side, the sonar equipment will produce images. The left side image will have a scan width of $s_l$ and the right side image will have a scan width of $s_r$. When the sonar wave strikes an object and is reflected back, the presence of that object will appear as a highlight and shadow in the image. The length of that shadow will depend not only on the size of the objects, but on the distance and angle at which the sonar wave is generated. In FIG. 1, lines 21, 22, 23, 24, 25 and 26 represent the shadows which would be cast by each object when insonified from the sonar source in vehicle 12. As can be seen from FIG. 1, those objects which are to the left of the vehicle will have shadows extending to the left of the object whereas objects to the right of the vehicle will have shadows extending to the right of the object. Objects 1, 3, 4 and 6 are identical in size and shape. However, the shadows cast are quite different in length depending upon the distance of the object from the sonar source. Furthermore, objects which are quite different in configuration or construction may cast an identical shadow. Shadows 22, 24 and 25 are of the same length, but result from the presence of three different objects. It should also be apparent from FIG. 1 that the relative orientation of the shadow will be in line with the path of the sonar wave which generates the shadow. The same object which has been insonified at two different angles may produce two different shadows.

Figure 2:
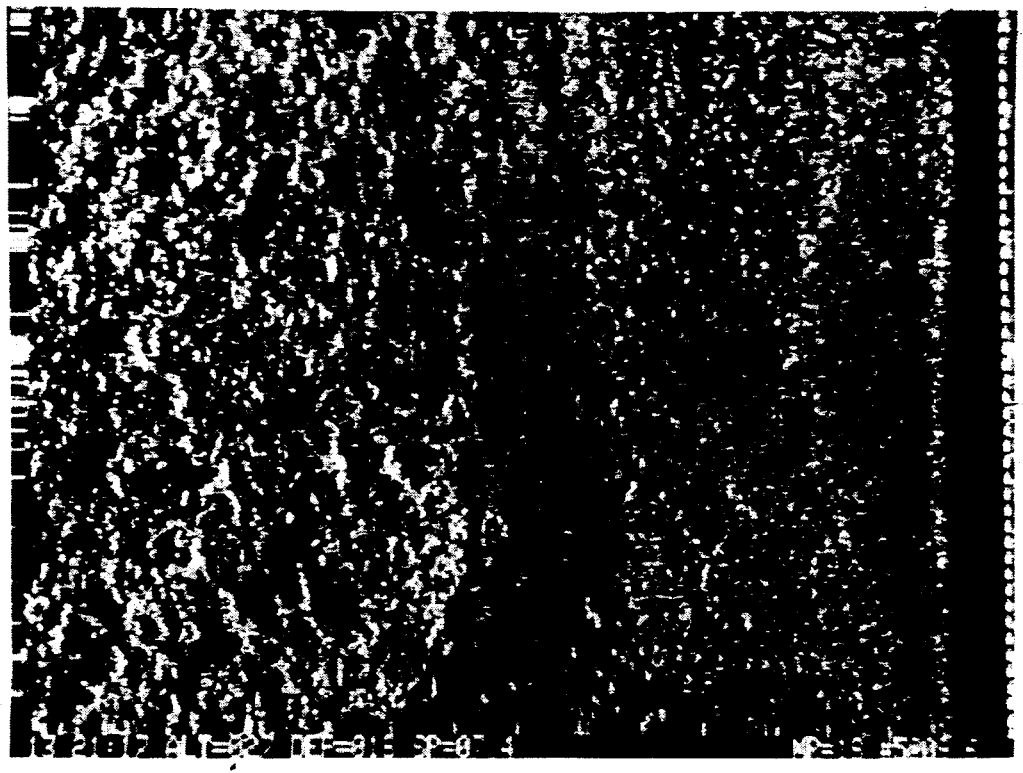
FIG. 2 is a raw sonar image.

In FIG. 2 we have shown an actual sonar image. The shadows in that image indicate the presence of an object. As one moves from right to left in the image of FIG. 2, the shadows become longer. The shadows which appear in FIG. 2 are usually reliable indicators of objects on the bottom. It is also known that mounds produce a highlight followed by a shadow while depressions produce the opposite effect of a shadow followed by a highlight.

A region of connected pixels of like gray level within a sonar image is called a "blob". A detection of highlight blobs or shadow blobs is accomplished by growing regions of adjacent pixels whose gray levels exceed or fall below a given threshold value. We have developed two approaches to reliably detect highlight and shadow blobs. The first finds the highlight and shadow blobs individually and then uses an association algorithm. The second finds associated highlights and shadows in one step using smooth spatial differentiation.

A sonar image increases in contrast from near range to far range. In order to use the same threshold value at every point in the image, the image must first be normalized. Using our method the image of FIG. 2 can be normalized to the image of FIG. 3. A normalization procedure was chosen to divide the image into vertical strips such that the amount of contrast increases from one strip to the next by a constant ratio. The assumption is made that the ratio of the far ranges of the total image to the vehicle's height is 10.0, and that 8 intervals are sufficient. In the event that the common overlap region is not the total image, then the number of intervals in the partial image is less, say n, where n<8. If the partial image is the total image, then n=8. The fractions of the image which determine the interval boundaries are given in equation 1.

$$n_i = \frac{[e^{\frac{i \cdot ln(1+r2)}{n}} - 1]^{\frac{1}{2}}}{r}, i = 0 \text{ to } n \tag{1}$$

Here it is assumed that the image is to the right of the vehicle's path and that the whole image is used. In general, these fractions must be adjusted depending on whether the image is to the left or right of the vehicle's path as well as whether the image is measured from the near or far edge. Once these fractions are computed, the image can be divided into intervals. Let the $k^{th}$ interval go from $y_{k-1}$ to $y_k$. Let $\mu_k$ and $\sigma_k$ be the the sample mean and standard deviation of the $k^{th}$ strip. The normalization procedure forces the normalized image to have the relation between mean and standard deviation of a Rayleigh distribution by computing a new mean for the $k^{th}$ strip by equation 2.

$$m_k = \sigma_k / 0.5227, \text{ for } k=1 \text{ to } n \tag{2}$$

Next compute the difference between the computed mean and the sample mean for each interval by equation 3.

$$\Delta\mu_k = m_k - \mu_k, \text{ for } k=1 \text{ to } n \tag{3}$$

The following computations are required to generate the normalized image:

$$\overline{y}_k = (y_{k-1} + y_k)/2, \text{ for } k=1 \text{ to } n \tag{4}$$

$$\overline{y}_o = y_o$$

$$\overline{y}_{n+1} = y_n$$

$$m_o = m_1$$

$$m_{n+1} = m_n$$

$$\Delta\mu_o \Delta\mu_1$$

$$\Delta\mu_{n+1} = \Delta\mu_n$$

The normalized sonar image is described by an intensity function $IN(i, j)$, where i is the row index and j is the column index of the $i, j^{th}$ pixel. $IN(i,j)$ is computed as follows:

$$\text{for } \overline{y}_{k-1} < j < \overline{y}_k, \text{ for } k=1,\ldots,n$$

$$\alpha_j = (j - \overline{y}_{k-1}) / (\overline{y}_k - \overline{y}_{k-1})$$

$$\beta_j = 1 - \alpha_j$$

$$\Delta\overline{\mu}_j = \alpha_j \Delta\mu_k + \beta_j \Delta\mu_{k-1}$$

$$\overline{m}_j = \alpha_j m_k + \beta_j m_{k-1}$$

$$IN(i,j) = \max(0, \min\{255, 50[(IO(i,j) + \Delta\overline{\mu}_j)/\overline{m}_j]\}),$$

for all rows i where $IO(i,j)$ is the image prior to normalization.

Both approaches used to associate highlights and shadows rely on a set of four low pass filter masks:

$$g_1 = \begin{pmatrix} 1 & 1 \\ 1 & 1 \end{pmatrix}_{(2 \times 2)} \quad g_2 = \begin{pmatrix} 1 & 1 & 1 \\ 1 & 1 & 1 \\ 1 & 1 & 1 \end{pmatrix}_{(3 \times 3)} \quad g_3 = \begin{pmatrix} 0 & 1 & 1 & 1 & 0 \\ 1 & 1 & 1 & 1 & 1 \\ 1 & 1 & 1 & 1 & 1 \\ 1 & 1 & 1 & 1 & 1 \\ 0 & 1 & 1 & 1 & 0 \end{pmatrix}_{(5 \times 5)}$$

and $$g_4 = \begin{pmatrix} 0 & 0 & 1 & 1 & 1 & 0 & 0 \\ 0 & 1 & 1 & 1 & 1 & 1 & 0 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 0 & 1 & 1 & 1 & 1 & 1 & 0 \\ 0 & 0 & 1 & 1 & 1 & 0 & 0 \end{pmatrix}_{(7 \times 7)}$$

The corresponding areas are:

$$A_1 = 4, A_2 = 9, A_3 = 21 \text{ and } A_4 = 37$$

Figure 3:
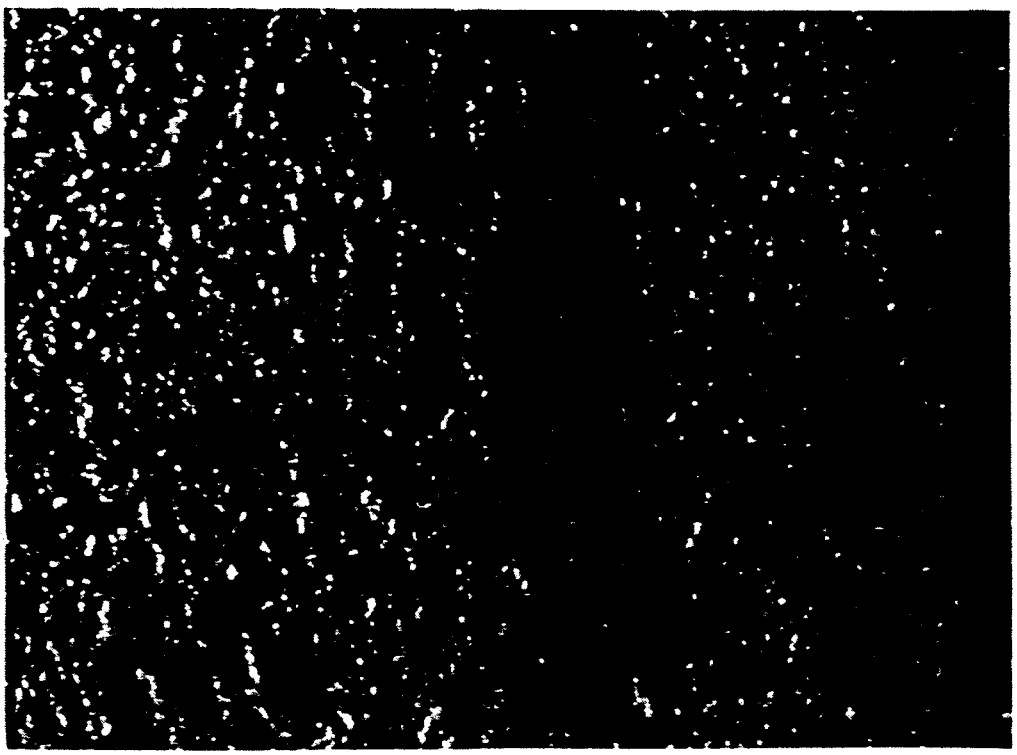
FIG. 3 is the image of FIG. 2 after being normalized in accordance with our method.
Figure 4:
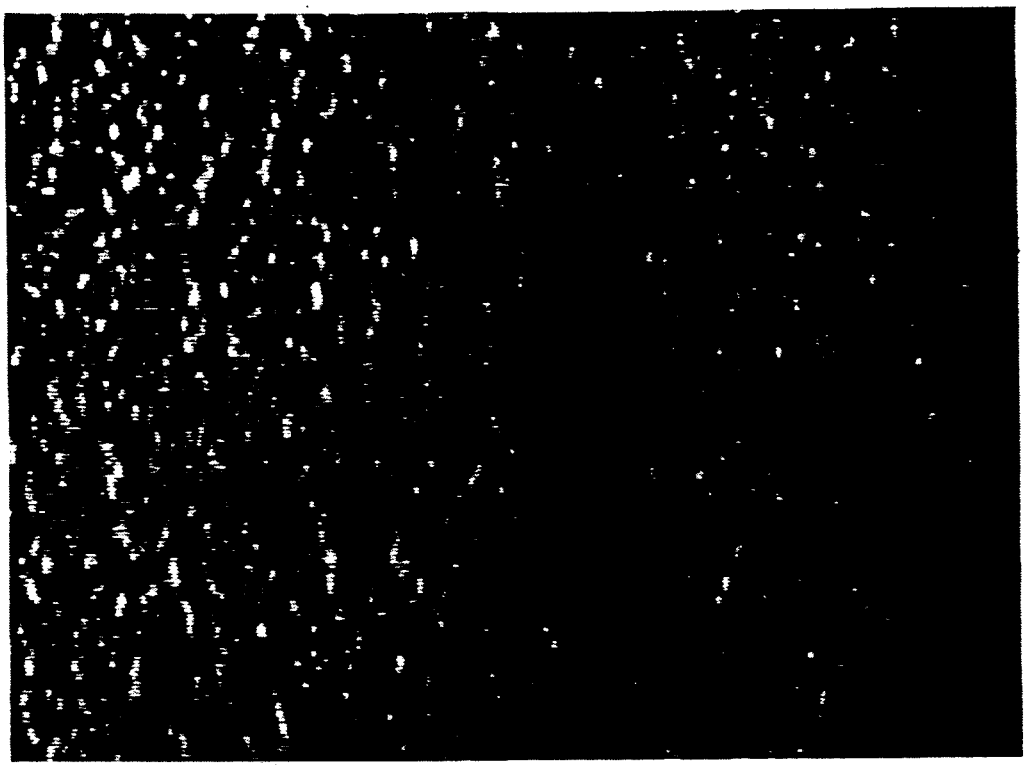
FIG. 4 is the image of FIG. 3 after it has been convolved using a present preferred low pass filter.
Figure 5:
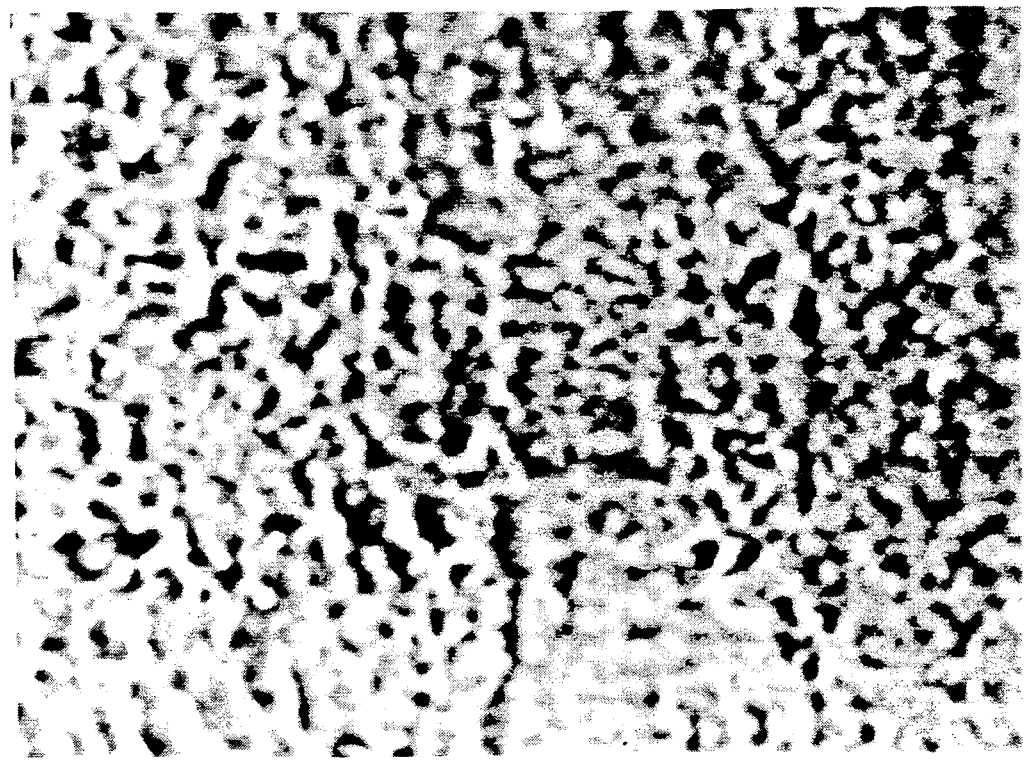
FIG. 5 is the image of FIG. 3 after it has been convolved with a second present preferred low pass filter.

Four different low pass images can be obtained by convolving each filter with the normalized image. FIGS. 3, 4 and 5 are examples of such images. The spatial differentiation filter size is a function of the low pass filter size. For example, if the image is to the left of the vehicle's path, then spatial differentiation is done by convolving $$d_1 = [-1\, 0\, 0\, 0\, 0\, 0\, 0\, 1]$$ with the $g_4$ filter. The spatial differentiation filter for $g_1$ and $g_2$ has 5 elements, and the filter for $g_3$ and $g_4$ has 7 elements. The $-1$ goes with the shadow and the $1$ with the highlight, so the array may have to be flipped depending on whether the image is to the left or right of the vehicle's path.

Figure 8:
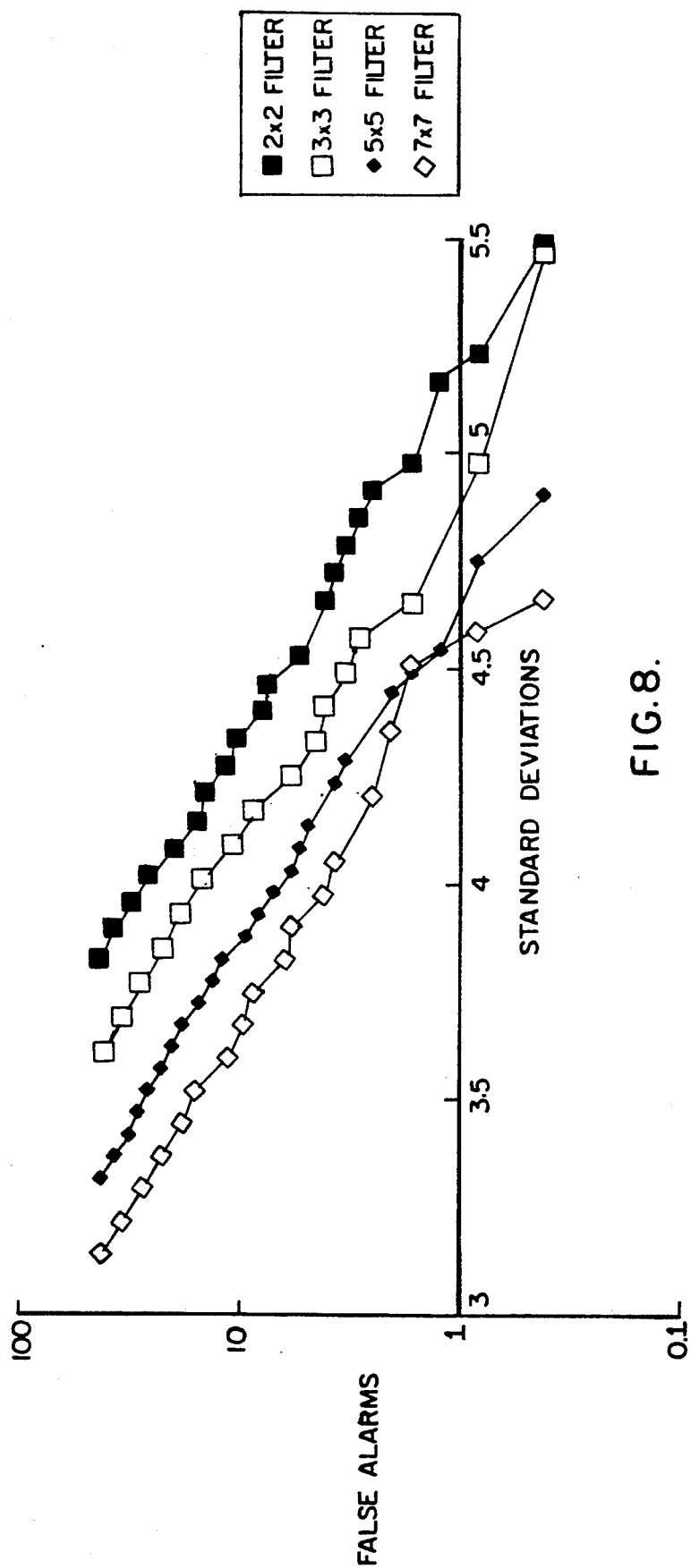
FIG. 8 is a graph showing the rate of false detections for a 100,000 pixels image after being filtered.
Figure 9:
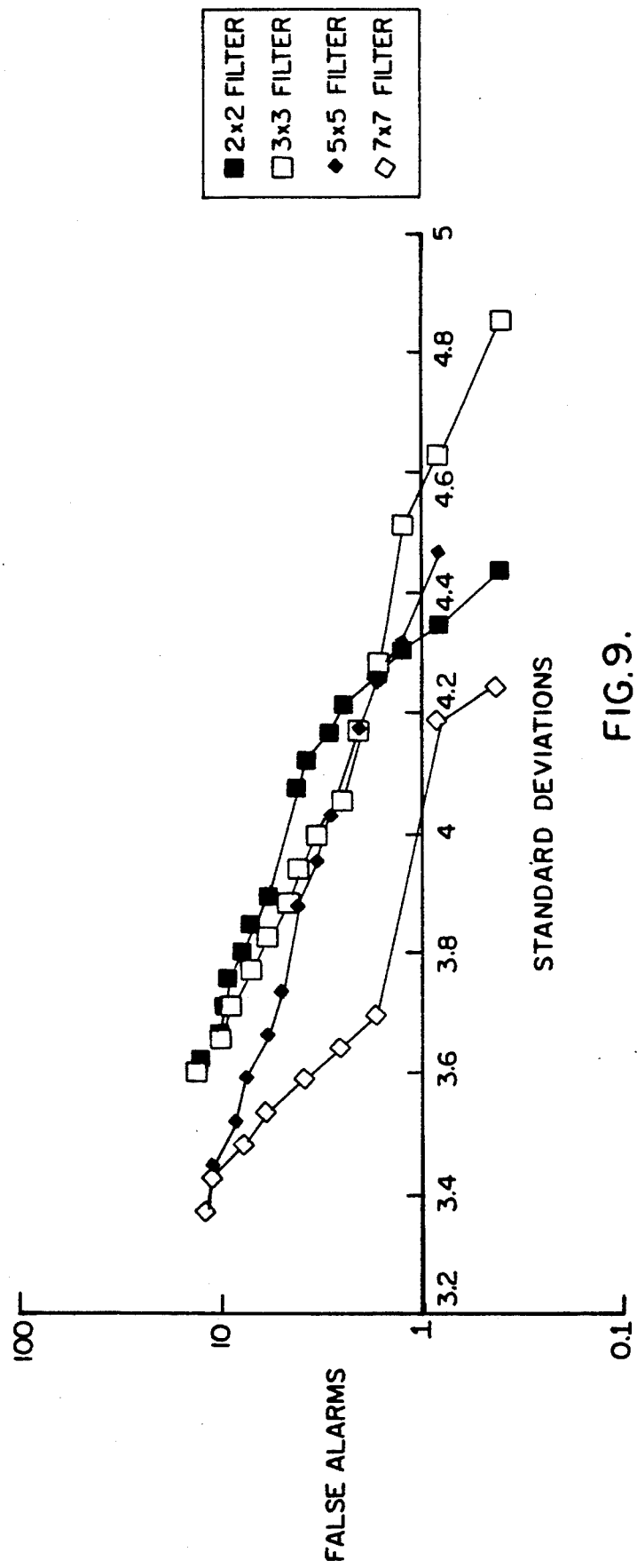
FIG. 9 is a graph showing the rate of false detections of the same 100,000 pixels image after being spatially differentiated and filtered.
Figure 10:
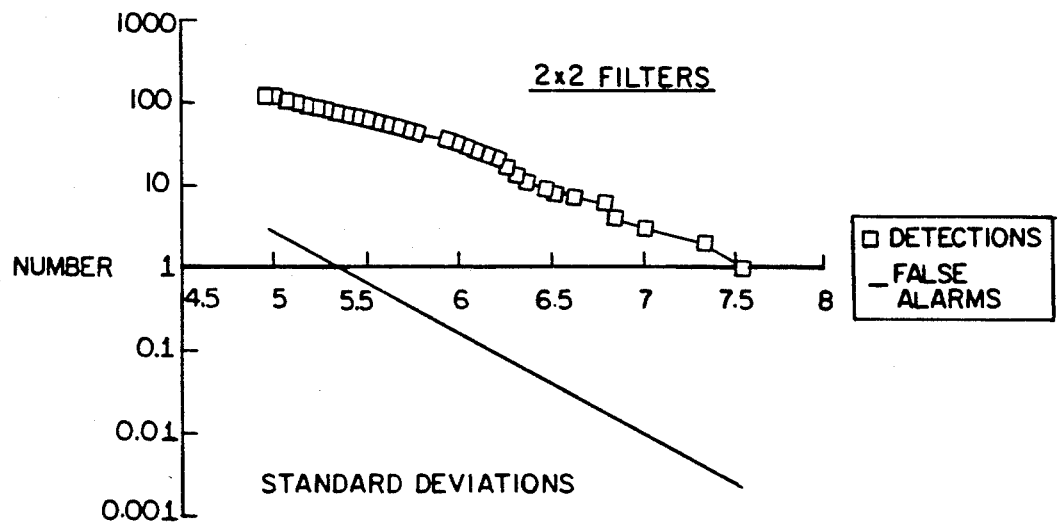
FIGS. 10 thru 13 are graphs of detection versus threshold for filters of various sizes.
Figure 11:
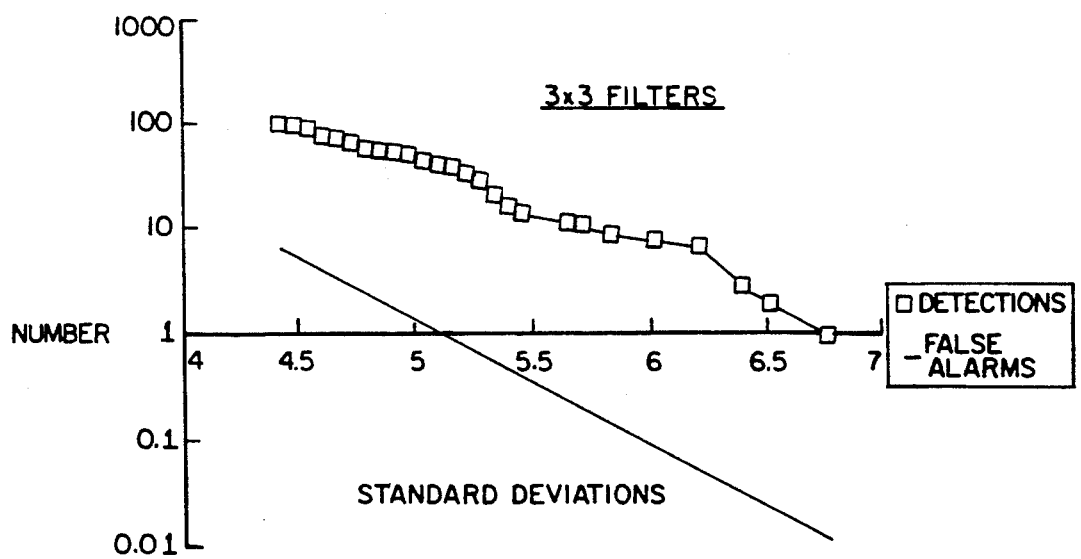
Figure 12:
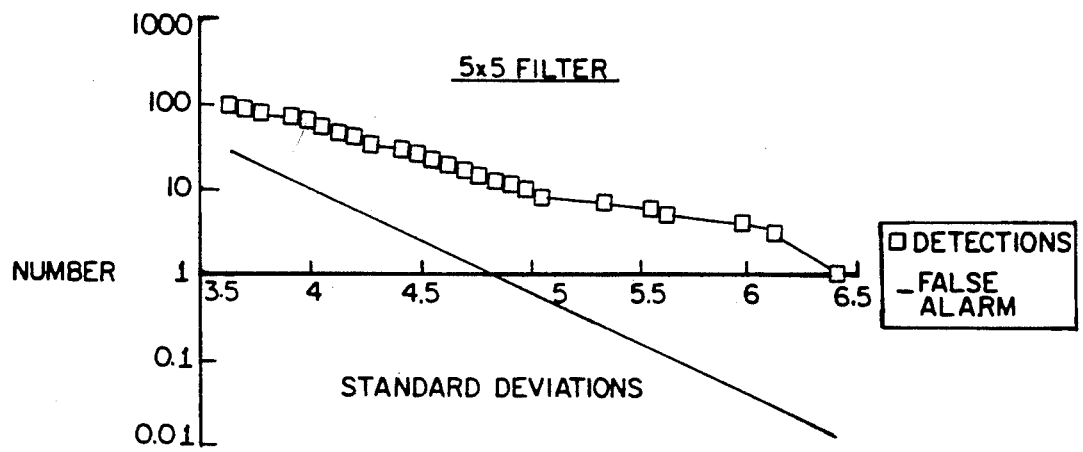
Figure 13:
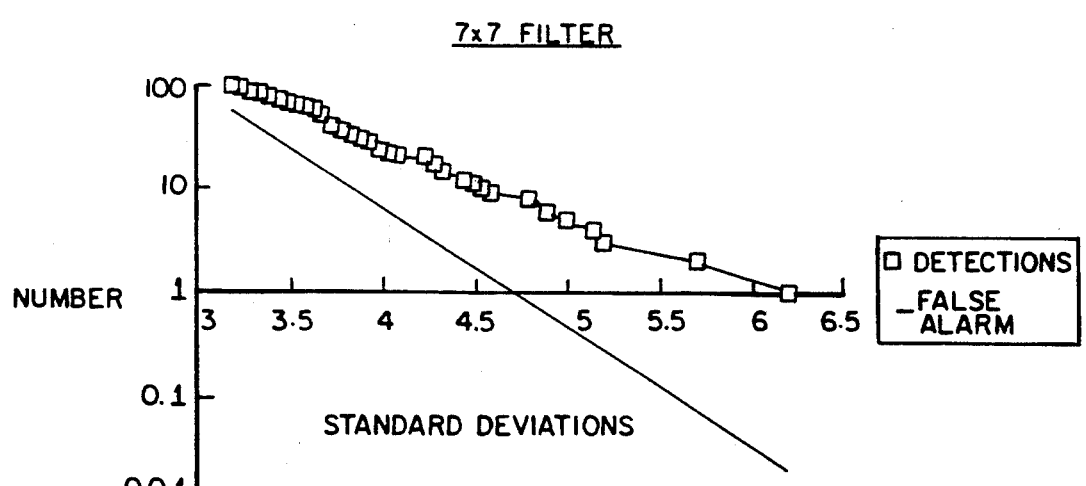

To better determine an automatic method for choosing the threshold level and smoothing filter size needed for target detection, detection studies were done on a flat, synthetic image with constant. Since this image is devoid of targets, any detections can be interpreted as false alarms. The number of highlight detections versus threshold for the various filters are shown in FIGS. 8 and 9. On a semilog plot, these curves approximate a straight line and may be modeled with $$\ln(FA) = K_0 + K_1\alpha \tag{5}$$

where FA is the number of false alarms per 100,000 pixels and $\alpha$ is the number of standard deviations that the threshold is displaced from the mean. $K_0$ and $K_1$ can be obtained by doing a least squares fit of the data. Equation 5 can be used to solve for FA in terms of $\alpha$ or to solve for $\alpha$ in terms of FA.

Figure 14:
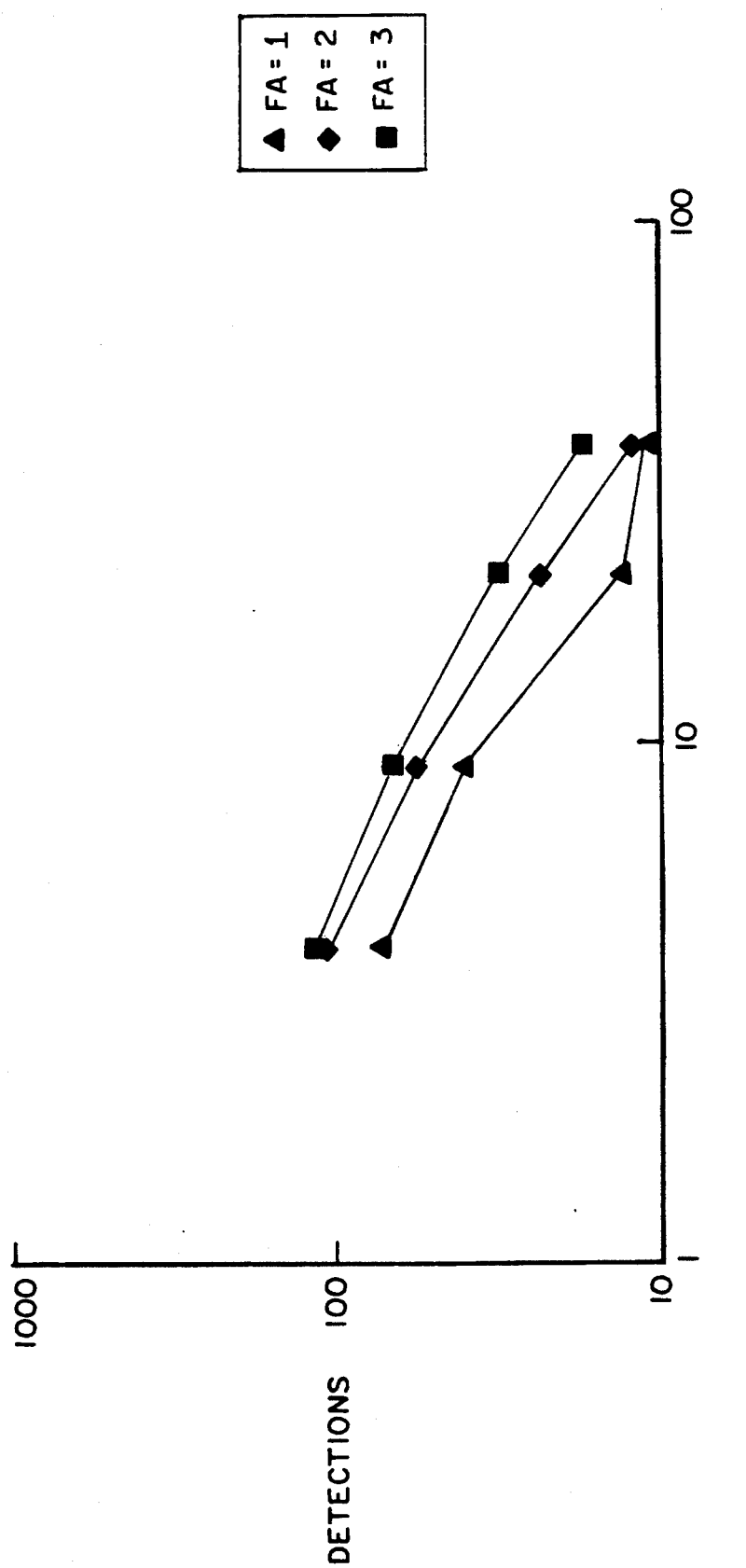
FIG. 14 is a graph showing detection versus filter area for three different false alarm levels.

In order to determine the appropriate threshold and filter required to detect highlight and shadow blobs, methods had to be derived to determine how many blobs of a certain size are in the image. Because of the noisy nature of sonar images, this is a difficult task. Information in a sonar image is encoded by way of parameter variations in the probability density function of the returned signal. Therefore, the best one can do is obtain a noisy estimate of the number of blobs of a certain size. A detection versus threshold study for various filter sizes was done on an image of high information content after normalization. The results are graphically displayed in FIGS. 10 thru 13. FIGS. 10 thru 13 show the number of detections and false alarms for each of four filter sizes over a range of threshold values. FIG. 14 shows detections versus filter area for three different false alarm levels. This graph is the straight line fit of the false alarm data for the flat, synthetic image. On a semilog plot, these graphs suggest the, following:

1. Detections versus threshold for a high information content sonar image form approximately a straight line.
2. At high thresholds, the false alarm graph is below the real detections graph.
3. As the filter size increases, the false alarm graph gets closer to the real detections graph.
4. At a low enough threshold, the false alarm graph might cross the detections graph.

The log-log plot of FIG. 14 shows that the number of detections varies inversely with filter size. The graphs of FIGS. 10 thru 14 suggest some simple heuristics that are useful in developing an automatic detection algorithm:

1. Detections vary exponentially with threshold value.
2. Detections vary inversely with filter size.
3. The smallest filter (highest pass in frequency) yields an estimate on the total number of blobs present.
4. False alarm curves from the flat, synthetic image can help estimate information content at a given threshold.

An adaptive feature or target detection algorithm whose objective is to find suitable features for matching two different sonar images must solve two problems:

1. Find an appropriate filter size,
2. Find a threshold $\alpha$ that yields approximately the desired number of detections, $N_D$.

The lowest frequency filter possible should be used to avoid too many detections. A large number of detections in both images can lead to false matches between subsets of the two different images. Also, a large set of points is undesirable for an initial match since the time required varies as $N^4$, where N is the number of points. Finally it must solve the above two problems for images with both high information content and low information content.

The solution can be divided into three steps:

1. Find the lowest frequency filter size that yields a reasonable number of detections,
2. Find the range of usable information in the image,
3. Find a threshold that yields the desired number of detections.

The algorithm is easily presented using the following definitions and notation:

| | |
|---|---|
| k | filter index. k = k1 is highest frequency, lowest area. k = k4 is lowest frequency, largest area |
| $FA_k(\alpha)$ | Solution of equation 5 for false alarms in terms of threshold $\alpha$ for k fixed. |
| $\alpha_k(FA)$ | Solution of equation 5 for threshold $\alpha$ in terms of false alarms for k fixed. |
| $\alpha_{FA}(k)$ | Solution of equation 5 for threshold $\alpha$ in terms of k for FA fixed. |
| $\alpha_{max}(k)$ | Maximum threshold on a real image convolved with filter $g_k$ for which a detection will occur, obtained from a histogram. |
| $D_k(\alpha)$ | Number of detections on a real image convolved with filter $g_k$ threshold $\alpha$, obtained from region growing. |
| $D1_k(FA) =$ | $D_k(\alpha_k(FA))$ Number of detections on a real image, filtered with $g_k$ and with threshold set in terms of FA, obtained from region growing. |
| $h_k(\alpha)$ | Curve fit of $D_k(\alpha)$ using two separate points and the functional form, $h_k(\alpha) = \exp(a_k + b_k \cdot \alpha)$      (6) |
| $N_D$ | Desired number of detections, $N_D \geq 8$. |
| $N_u$ | Usable detections. |

For purposes of dividing images into low information, medium information and high formation the following regions are defined:

| | | |
|---|---|---|
| Low information: | $4 \leq D1_k(2) < 8$ | $k_1 \leq k \leq k4$ |
| Medium information: | $4 \leq D1_k(2) \leq 8$ | $k = k4$ |
| and | $D1_k(2) \geq 8$ | $k = k1$ |
| High information: | $D1_k(2) \geq 8$ | $k1 \leq k \leq k4$ |

In the above expressions the false alarms have been set to two.

The function $h_k(\alpha)$, which gives the number of detections at a given threshold, is obtained in the following way:

| | |
|---|---|
| Point 1: | $D_k(\alpha_{max}(k))$ and $\alpha_{max}(k)$ |
| Point 2: | $D1_k(FA_{opt})$ and $\alpha_k(FA_{opt})$ |
| | If $D1_k(2) \geq N_u$ |
| | then: $FA_{opt} = 2$ |
| | else: $FA_{opt}$ = maximum of FA subject to |
| | $2 \leq FA \leq 4$ and |
| | $D1_k(FA) \leq N_u$ |

If $D1_k(FA_{opt})$ is less than or equal to $D_k(\alpha_{max})$, then $h_k(\alpha)$ is constant and equals $D1_k(FA_{opt})$. Otherwise the two points above are used to define $h_k(\alpha)$ according to equation 6.

The algorithm defined below will find a suitable number of detections for high information content images without exceeding $N_D$. For low information content images, it will adjust $N_D$ downward so that an excessive number of false alarms are not included in the detections found by region growing.

Figure 15:
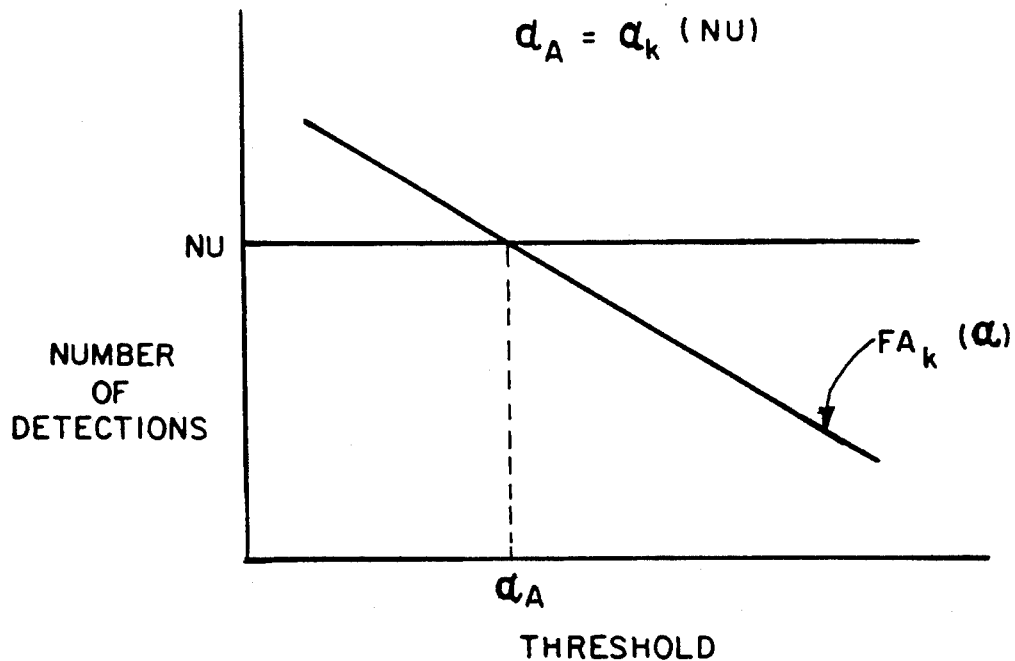
FIGS. 15 thru 18 are graphs showing how to select the constraints for threshold $\alpha$.
Figure 16:
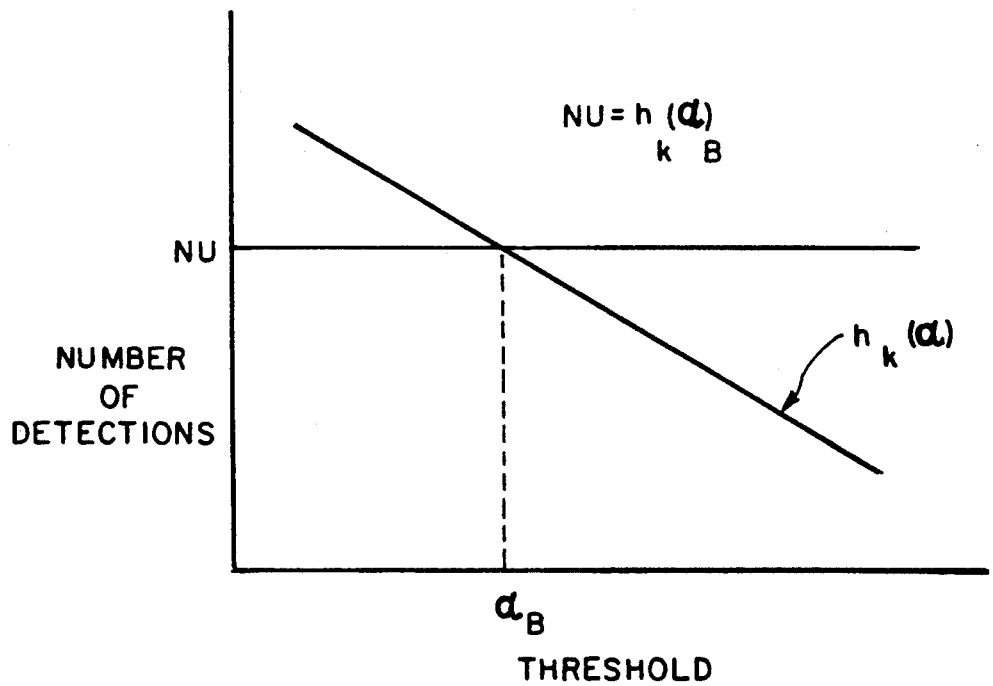
Figure 17:
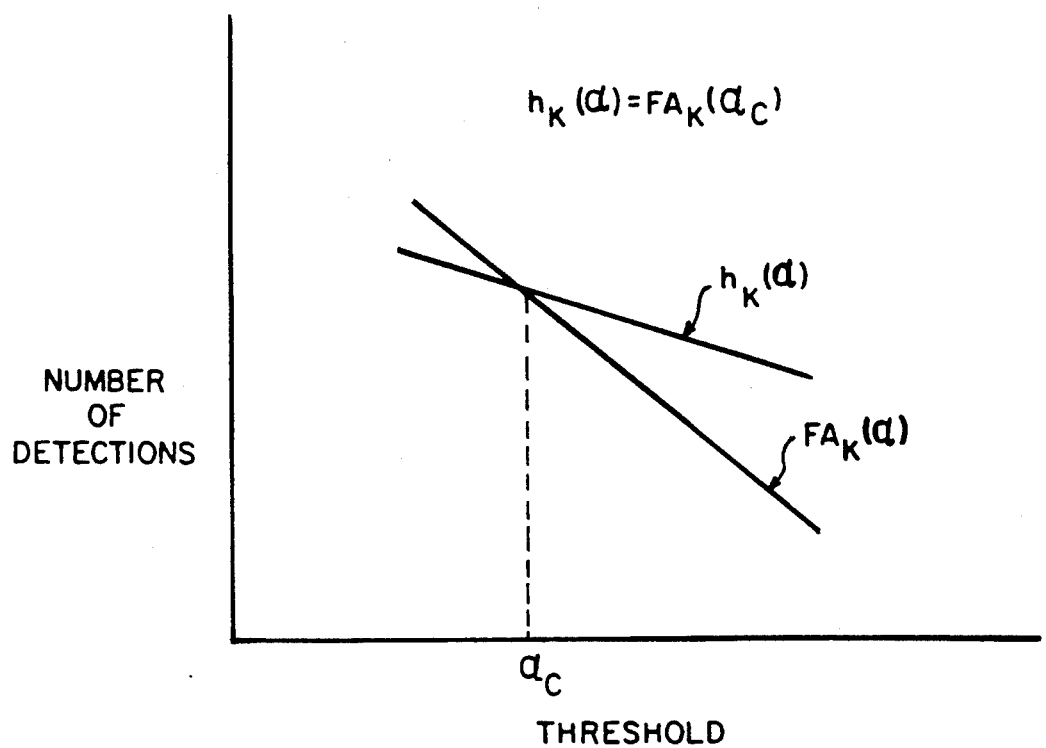
Figure 18:
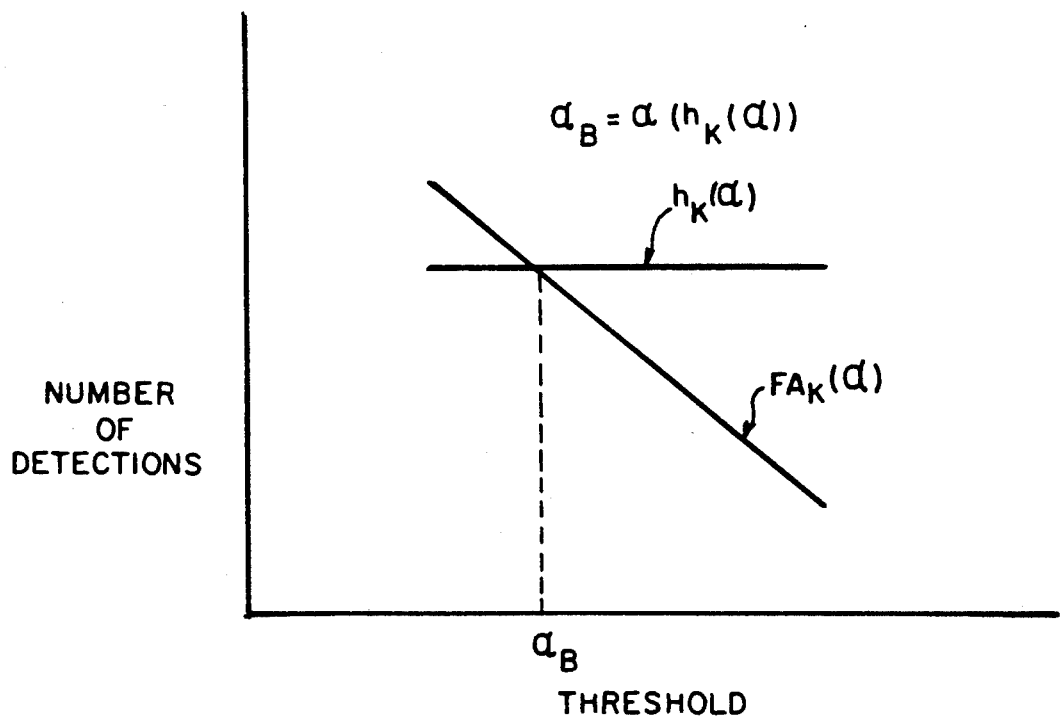

1. First, find the maximum filter size that yields the minimum number of detections suitable for a match. Specifically, set FA = 2 and k = k4. Search down in k until $D1_k(FA) \geq 4$ or k < k1. If k goes below k1 declare insufficient data and exit. Else save k and $D = D1_k(FA)$.
2. Determine if sufficient information exists to decrease the filter size to allow for more detections than just the minimum. Explicitly, if $D1_{k1}(FA) \geq 8$ and D < 8 then search down in k until $D1_k(FA) \geq 8$ and save k; otherwise, go directly to step 3.
3. Estimate the maximum usable detections subject to an upper bound, by searching up in FA until $D1_{k1}(FA) \geq N_D$ or FA = 4. Set $N_u$ = Minimum $\{N_D, D1_{k1}(FA)\}$.
4. Bound $\alpha$ from below by determining which of a number of constraints is active. Evaluate the following, which are shown graphically in FIGS. 15 thru 18.
   a) $\alpha_A = \alpha_k(Nu)$ as shown in FIG. 15
   b) If $h_k(\alpha)$ is not constant, then $\alpha_B$ is the solution to: $N_u = h_k(\alpha_B)$ which is shown in FIG. 16
   As can be seen in FIG. 17 $\alpha_C$ is the solution to:

$$h_k(\alpha_C) = FA_k(\alpha_C)$$

$$\alpha_B = \text{Maximum of } \{\alpha_B, \alpha_C\}$$

c) Finally from FIG. 18 we see that if $h_k(\alpha)$ is constant then $$\alpha_B = \alpha_k(h_k(\alpha))$$

Consequently, $\alpha$ = Maximum $\{\alpha_A, \Delta_B\}$

5. Use threshold $\alpha$ found in step 4 to obtain detections to be used for image matching.

Figure 6:
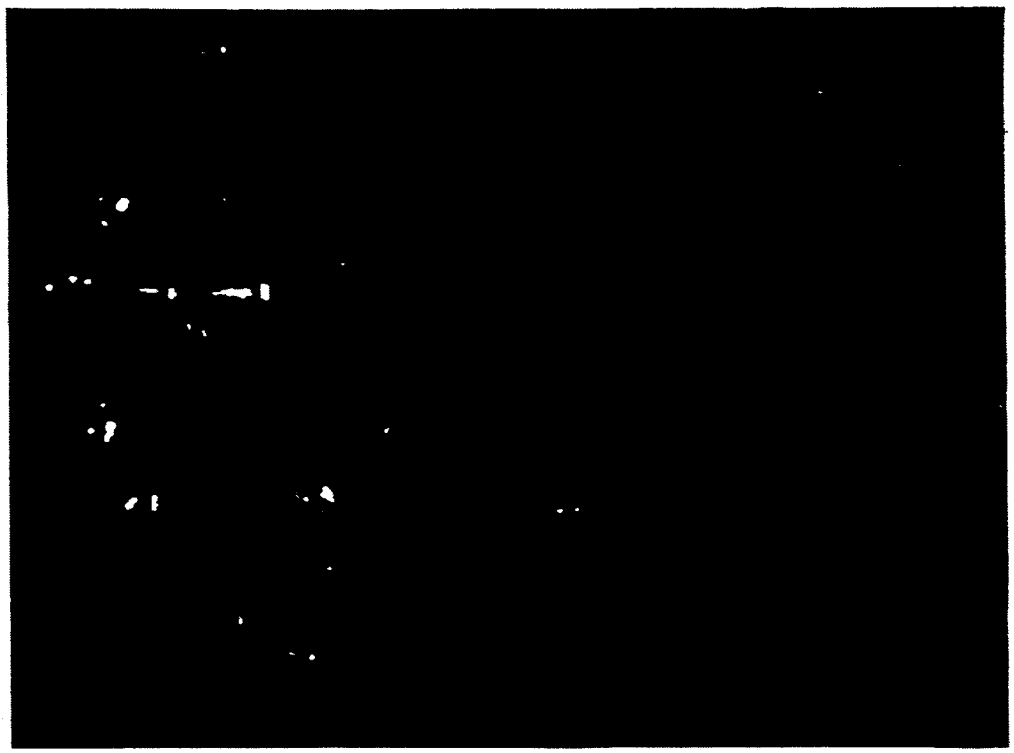
FIG. 6 is the image of FIG. 5 processed to show highlight-shadow pairs in the image of FIG. 5.

Having thus selected a filter and threshold value, the sonar image of FIG. 2 can be normalized to produce the sonar image of FIG. 3. Then, that image is convolved to produce the sonar image of FIG. 4 or FIG. 5 depending upon the filter which is used. That image can be thresholded and region grown to form the image of FIG. 6 or used for matching.

Figure 7:
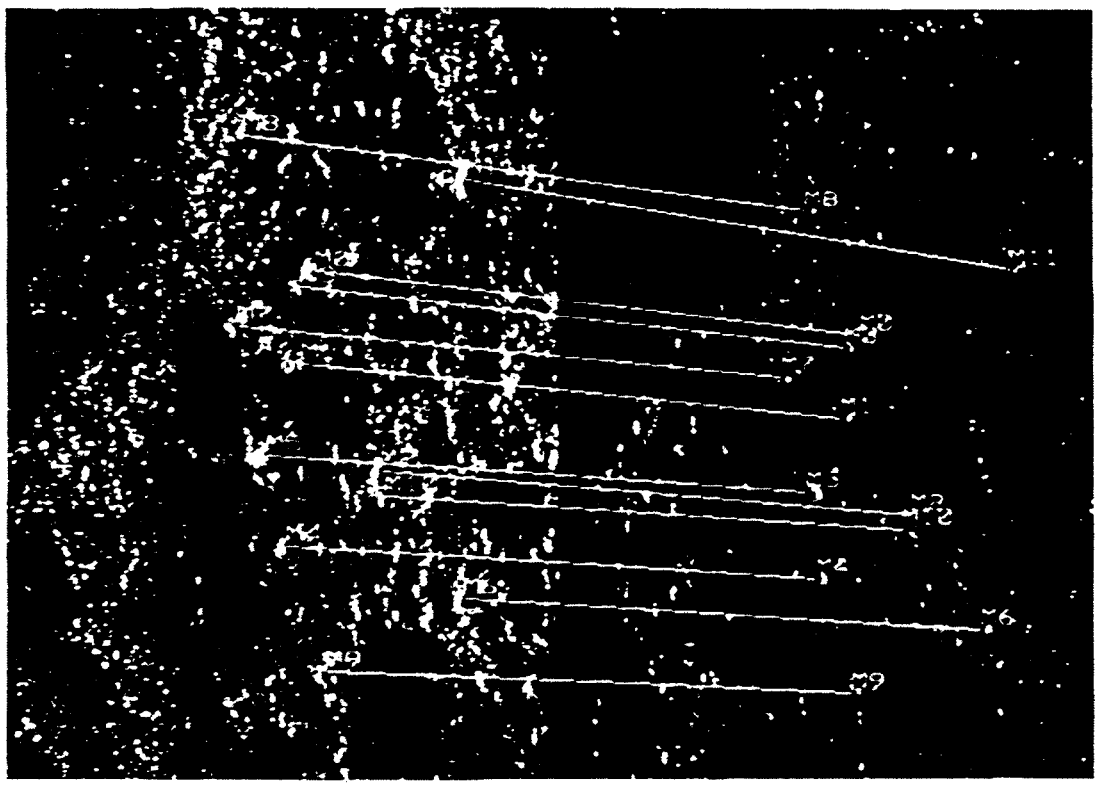
FIG. 7 is a display of two sonar images taken at different times on which we have indicated the objects which match, the match being determined using the methods of the present invention.

In FIG. 7 we show two images which have been processed with our method and whose features have been matched by computer. In FIG. 7 lines between the images connect matching features which are labeled M0 thru M10 in each image. Our method using a computer program can quick match features which would be difficult or impossible for humans alone to do. Furthermore, feature-based matching is required for side scan sonar. Therefore, our image matching method is particularly useful for side scan overlap navigation as described below.

Although sonar images have not previously been used for navigation purposes the present method permits such usage. We assign coordinates or map positions to objects in the images. These coordinates can be used to determine the position of the vessel, to steer the vessel or for other navigation purposes.

A side scan sonar creates a sound reflectance image of the ocean bottom to the port and starboard side of the sonar bearing vehicle by active insonification of the water volume using a very narrow azimuth beam pattern. In search mode, the vehicle travels in a straight line and creates a sonar image whose length is proportional to the distance traveled and whose width is proportional to the range of the sonar. In order to do feature based navigation some man-made or natural objects must be detected in this first pass. The detected objects are assigned coordinates in the vehicle's navigation system.

The vehicle then makes a U-turn, and follows a translated path parallel to the previous path so as to create another sonar image with a fixed percentage of overlap with the previous image. This procedure is repeated with alternating left and right U-turns at the end of each pass until the desired area is completely covered. In the region of overlap, some of the objects detected in the first pass must be detected again. In each of these sightings, the position of each object will differ. Therefore, different coordinates will be assigned to these objects. Matching techniques are used to pair the same objects.

After one has determined by our matching techniques that the same object is in two images, he can check to see if that object has been recorded twice under different coordinates. If so, he can update the navigation system using information from our matching algorithms to reflect this fact. If these errors are not corrected, they will accumulate during the mission thereby making the navigation system less and less accurate.

Figure 19:
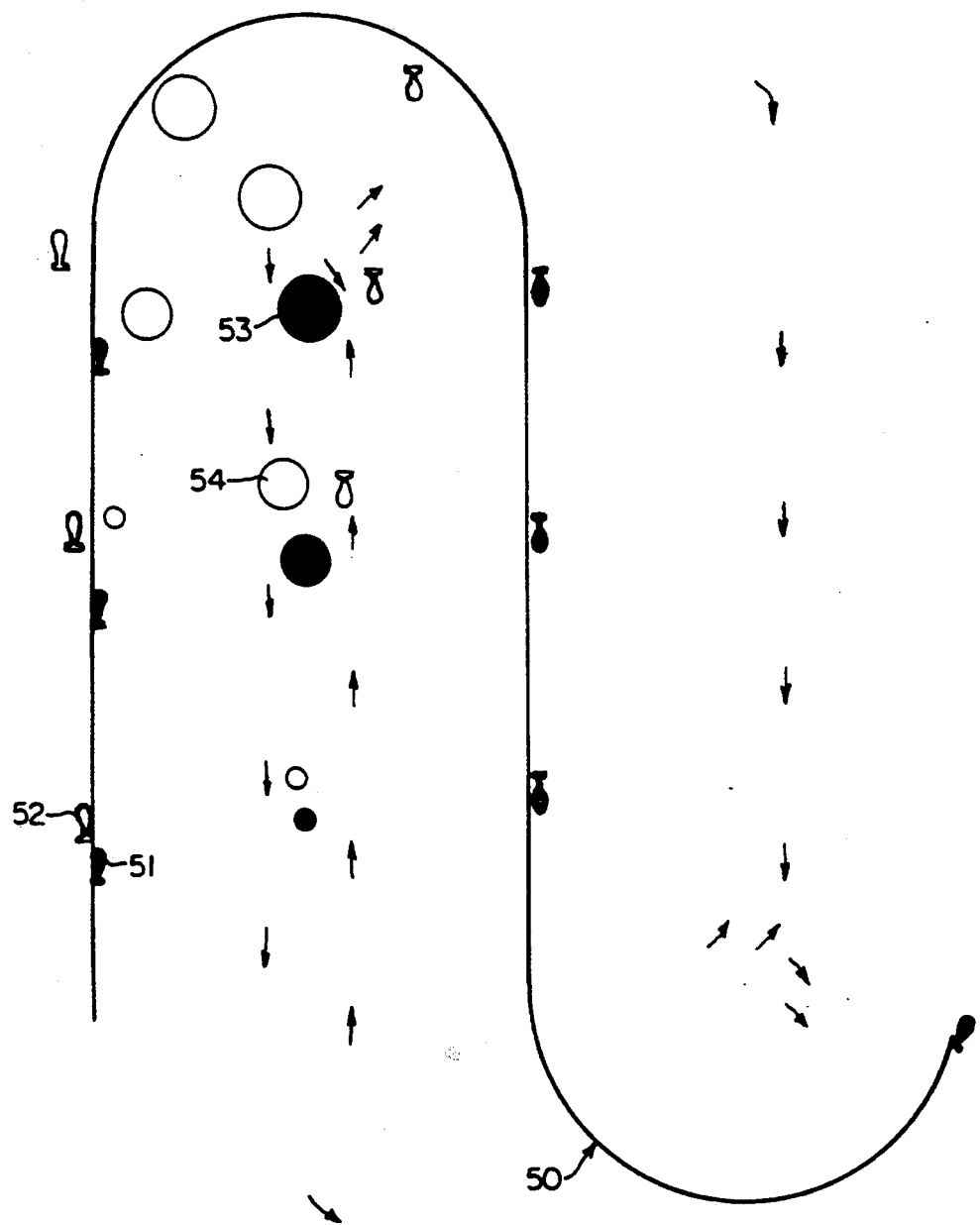
FIG. 19 is a diagram based upon sonar scans showing a vehicle in the search mode without error correction.

FIG. 19 shows simulated results of side scan sonar overlap navigation using compass and RPM meter without error correction. The solid line 50 shows the vehicle's path in a search mode. The solid vehicle icon 51 shows the vehicle's true position at the time each feature is detected. The outline of the vehicle 52 shows the perceived vehicle location at the same time. Filled circles 53 indicate true positions of features; unfilled circles 54 indicate perceived feature positions. Arrows show sonar range. Features exist in the overlap region.

Figure 20:
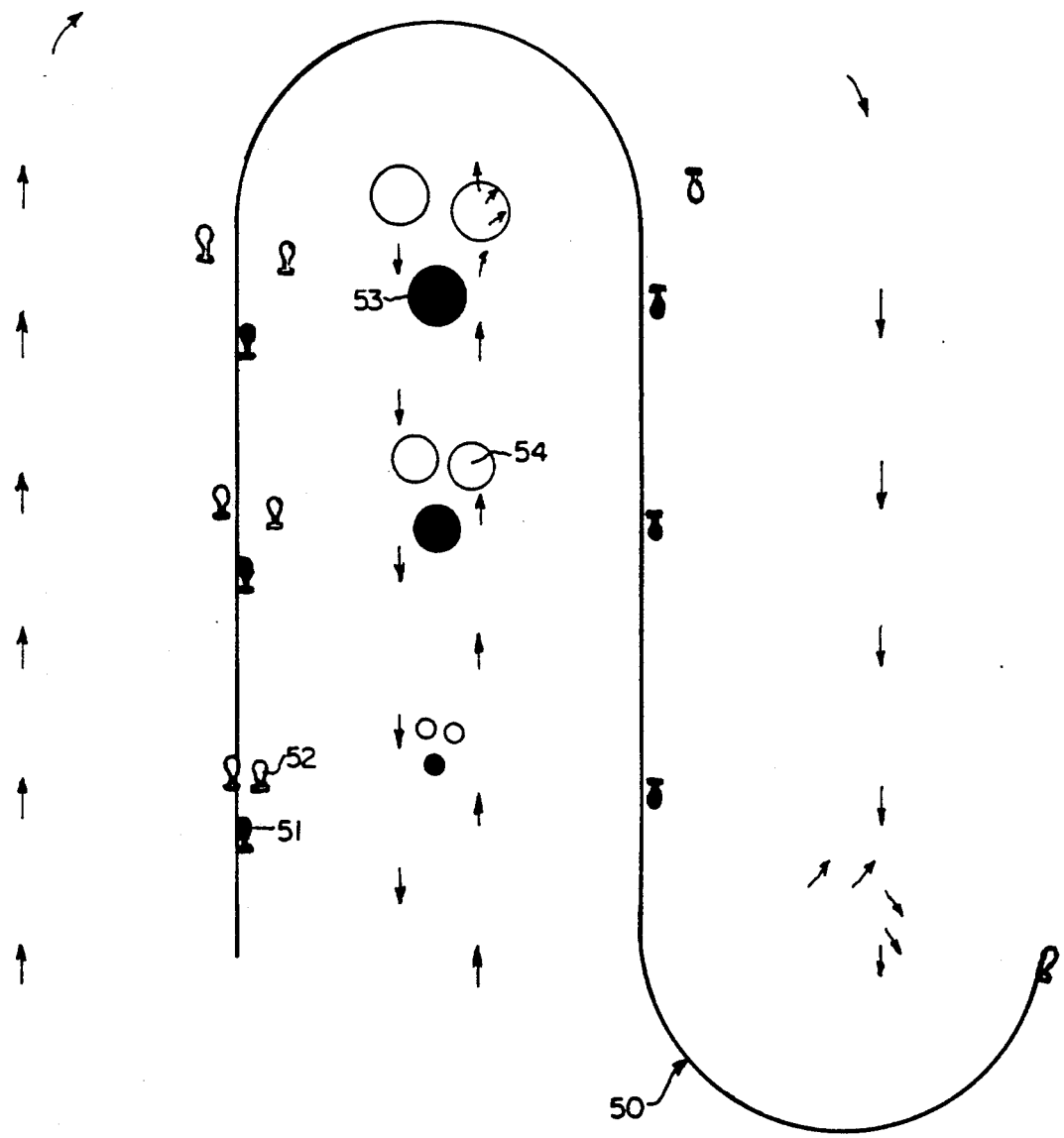
FIG. 20 is a diagram similar to FIG. 19, but modified using state estimation to reduce errors in obtaining position estimates of the vehicle and features.

FIG. 20 shows simulated results of side scan sonar overlap navigation using compass and RPM meter with error correction. Objects are depicted and numbered as in FIG. 19. When a feature is detected a second time, state estimation is used to correct the perceived vehicle and perceived feature locations. The result is that by the time the smallest feature is detected twice, the corrections are such that the perceived vehicle locations are nearly identical to the actual vehicle locations. Likewise, the perceived feature locations nearly coincide with the actual feature locations.

Figure 21:
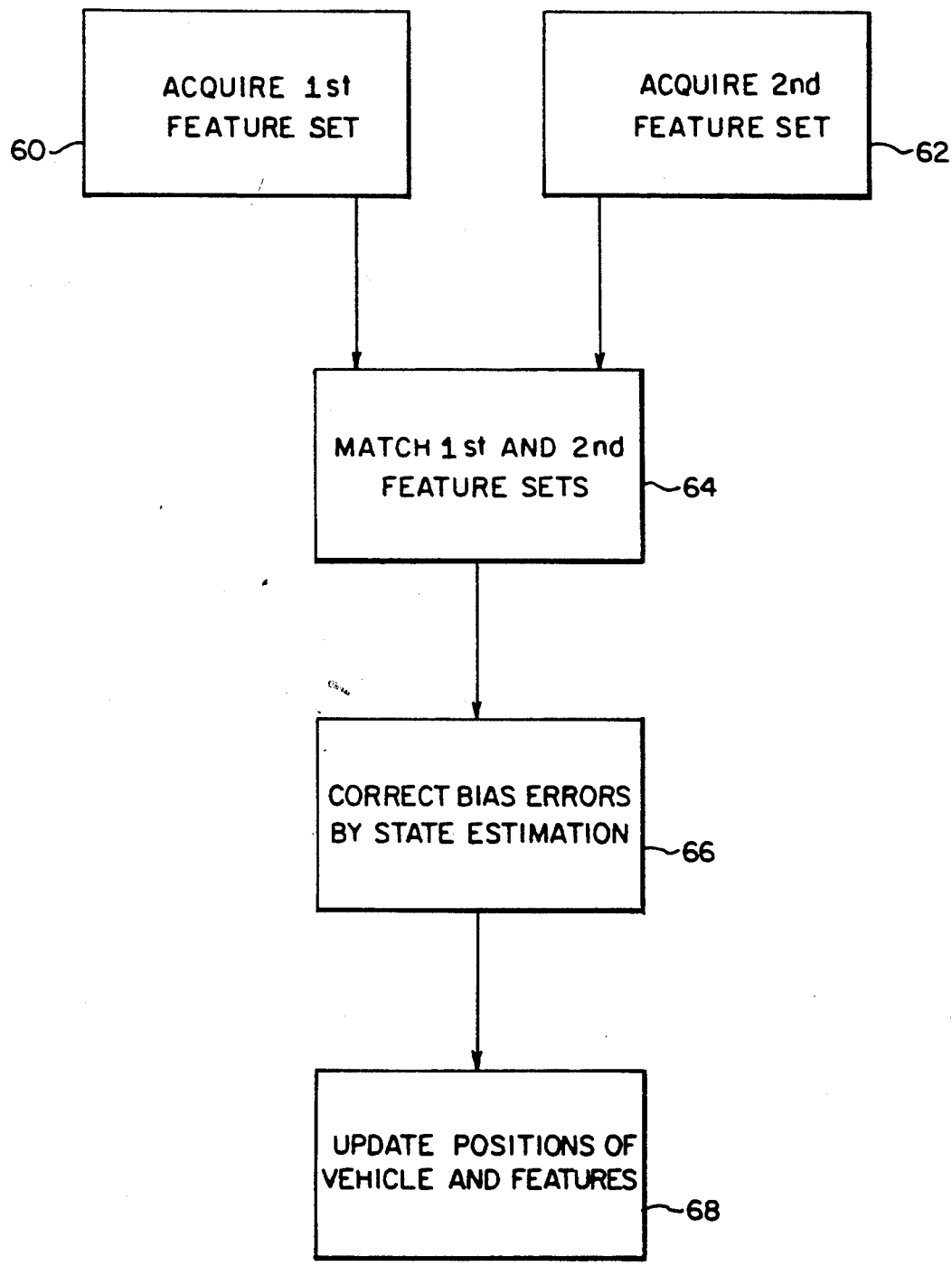
FIG. 21 is a block diagram showing the basic steps of one side scan sonar overlap navigation.

In FIG. 21 we provide a block diagram of our matching technique. We begin with a first sonar image or set of images 60 and a second sonar image or set of images 62. Next we apply a matching algorithm to images 60 and 62 as indicated by block 64. Then we correct bias errors by state estimation as indicated by block 66. Finally, at block 68 we update positions of the vehicle and features.

Once the matching algorithm pairs the detections of one pass with the detections of an adjacent pass, this information is acted upon by the state estimation algorithm. The state estimation algorithm works with position data, the x and y coordinates of the centroids of the detected objects. As discussed above, the position estimates of the centroids of the same object as seen on separate passes will generally differ because of errors. With an appropriate mathematical model describing the statistical behavior of the errors, the state estimation algorithm uses the position data to refine the position estimates of the objects as well as to update the position estimate of the vehicle given by the navigation system.

The requirements for the matching of two side scan sonar images with known overlap are fairly simple because of the following assumptions:

1. Since the vehicle will be approximately the same height on each pass, the two adjacent passes will have the same scaling.
2. Readings from the navigation system can be used to correct orientation errors to within one degree.
3. In the deep ocean, the number of important features on each pass will be relatively small.

A procedure derived from "Point Pattern Matching by Relaxation" by Ranade and Rosenfeld was sufficient to do the initial matching. In addition to modifications of this approach, we have developed two additional matching algorithms. All three of these procedures must be used to find successful matches required to implement side scan sonar overlap navigation. Each of these procedures will be discussed in turn.

In the initial matching algorithm, navigational data is used to provide an upper bound on the expected error between two sets of feature points $\{P\}$ and $\{Q\}$ to be matched. If the distance between any two points $P_i$ and $Q_j$ exceeds the upper bound, then they cannot be matched and are assigned scores of zero. Use of this initial test eliminates impossible matches and greatly reduces the computational cost, which is proportional to the fourth power of the number of points. Those points which are possible matches are scored for every possible pair $(P_i, Q_j)$ in the following way. First set $\{P\}$ is translated such that point $P_i$ is placed on top of point $Q_j$. Then for every point $P_h$ in $\{P\}$ and $h \approx i$, the closest point $Q_k$ (in $\{Q\}$ with $k \approx j$) to $P_h$ is found and its distance squared, $d^2$, is computed. The average errors in the points $\{P\}$ and $\{Q\}$ can be approximated with a scale factor r. With $$x = d^2/r^2 \qquad (7)$$

and $$\Delta s = \frac{1}{1 + x + \frac{1}{2}x^2} \qquad (8)$$

the score of pair $(P_i, Q_j)$ is incremented by the corresponding $\Delta s$ for each $P_h$ examined. A matrix $[s_{ij}]$ is formed from the scores with $s_{ij}$ the score of pair $(P_i, Q_j)$. The matching process is completed by choosing pairs whose score is both the row and column maximum. A data file of the matched pairs and their scores is then created for further processing.

In images containing many highlight/shadow blobs (regions of connected pixels of like gray level), it is possible to find subsets of points from one image that match subsets from the other image even though the matches are incorrect from a global point of view. A post-processing matching algorithm is used to eliminate these incorrect matches in the following way.

1. Rank all pairs according to their score starting with the highest score.
2. Compute an average of the vector translations defined by the pairs appearing in the ranked list. The first value of the average is the translation defined by the highest scored pair or first pair.
3. Find a new score for each pair based on the difference between their translation average and the average translation. Obtain a new score by using equations (7) and (8) to score the difference distance squared.
4. Accept the pair (or match) as good if its new score is greater than the threshold.
5. We prefer to update the average of the translation by the translation of a newly accepted pair.

The result of post matching is a data file of matched pairs of points all of which determine a common translation. Pairs of points which do not share this common translation are eliminated even if they had high scores from the initial matching.

We then prefer to use a third matching procedure confirm matches on sets of points too large to initially match in a reasonable amount of time. Input to this procedure consists of:

1. Data file of matched points $\{P\}$ and $\{Q\}$ from the initial match or from the postprocessing match.
2. Two data files of points $\{R\}$ and $\{S\}$ yet to be matched.

This procedure computes a match between sets $\{R\}$ and $\{S\}$ in which set $\{R\}$ and set $\{P\}$ are from one image and set $\{S\}$ and set $\{Q\}$ are from the other image. The method is as follows:

1. Compute the translation needed to align set $\{P\}$ with the set $\{Q\}$ using their centroids.
2. Apply this translation to set $\{R\}$.
3. Match $\{R\}$ with $\{S\}$ by finding points from $\{R\}$ and $\{S\}$ that are the closest to each other. Use equations (7) and (8) to score each matched pair.

The time required by this algorithm goes as $N^2$, whereas the time required by the initial matching algorithm goes as $N^4$, where N is the number of points.

After matching detections from adjacent passes, state estimation is used to reduce errors in both vehicle and feature positions. The state estimation procedure seeks a maximum likelihood estimate to the state vector $\mu$ of the system based upon the measurement vector z corrupted by the error vector e. The vehicle path geometry induces a model of the system, $$z = f(u) + e \qquad (9)$$

with error statistics $$E\{e\} = O \qquad (10)$$

and $$E\{ee^T\} = R, \qquad (11)$$

where R is the covariance matrix. The well known maximum likelihood estimate is given by that u which minimizes the functional, $$J(u) = [z - f(u)]^T R^{-1} [z - f(u)]. \qquad (12)$$

This mildly nonlinear problem is quickly solved by the iterative procedure.

$$\Delta u_k = H^T R^{-1} H(z - f(u_k)) \qquad (13)$$

$$u_{k+1} = u_k + \Delta u_k \qquad (14)$$

$$H = \delta f(u)/\delta u^T \qquad (15)$$

The state variables which make up the vector u are:
$xo_j, yo_j$ the coordinates of the centroid of the $j^{th}$ object,
$xv_i, yv_i$ the coordinates of the vehicle when its sonar "sees" object j, and
$b_k$ the constant but unknown biases in the navigation data.

The measurements which make up the vector z are:
$\alpha_j$ the heading angle of the vehicle when its sonar "sees" object j
$d_j$ the range of object j measured by the sonar, and
$x_i, y_i$ the change in position of the vehicle from point i-1 to point i as measured by the navigation system.

Typical equations making up the vector function f(u) are:

$$\alpha_j = \tan^{-1} \frac{(yo_j - yv_i)}{xo_j - xv_i} + e\alpha_j \qquad (16)$$

$$d_j = [(xo_j - xv_i)^2 + (yo - yv_i)^2]^{\frac{1}{2}} + ed_j \qquad (17)$$

$$\Delta x_i = xv_{i=xvi-1} + ab_k + ex_i \qquad (18)$$

$$\Delta y_i = yv_{i=yvi-1} + ab_s + ey_i \qquad (19)$$

The convariance matrix R is a function of the type of navigation system, the geometry of the vehicle path, and the time interval. The choice of unknown biases represented by the terms $ab_k$ and $ab_s$ will also depend upon the type of navigation system used.

State estimation is able to reduce the errors in all of the state variables whenever the position coordinates $(xo_j, yo_j)$ of an object appear in more than one measurement equation. When an object is sighted twice, the graph connecting the position points of the vehicle and the object contains a loop. Such a loop contributes to redundancy, allowing errors to be averaged and thus reduced.

Our method reduces navigation errors during covert underwater operations during which the vehicle cannot surface to get a GPS fix. It enables overlap navigation with no missed areas and without undue overlap.

We are also able to identify unknown but constant bias errors enabling the vehicle's position and the positions of objects in the image to be estimated more accurately.

Although we have disclosed certain present preferred embodiments of the invention, the invention is not limited thereto, but may be variously embodied within the scope of the following claims.

We claim:

1. A method for locating objects in sonar images and other images represented by a matrix of pixels each having a shade of gray within a known grayness range taken by a vehicle of a known vehicle height scanning across a scan width at known size comprised of the steps
   a) normalizing brightness and contrast in the sonar image comprising the steps of
      i) Dividing the image of into vertical strips each strip having a width w wherein the width w of each strip i expressed for each strip in terms of $$\frac{\text{strip width}}{\text{image width}} \text{ is } n_i = \frac{[e^{\frac{(i)(ln(1+r2))}{n}} - 1]^{\frac{1}{2}}}{r}$$

wherein i is an integer from 0 to n; and $$r = \frac{\text{scan width}}{\text{vehicle height}}$$

ii) Creating a histogram for each strip, the histogram being a representation of grayness values for all columns of pixels within the strip
   iii) Determining a sample mean $\mu_k$ and a standard deviation $\sigma_k$ for each histogram created for each strip
   iv) Computing a new mean $M_k$ for each strip by solving the equation $$M_k = \sigma_k/0.5227$$

v) Computing a difference $\Delta\mu_k$ between the new mean $M_k$ and the sample mean $\mu_k$ for each strip so that $$\Delta\mu_k = \mu_k \text{ for } k=1 \text{ to } n$$

vi) for strip that $1+Y_k)/2$ for $k=1$ to n and $Y_o = Y_o$; $Y_{n+1} = Y_n$; $m_o = m_1$; $m_{n+1} = m_n$; $\Delta\mu_o = \Delta\mu_1$; and $\Delta\mu_{n+1} = \Delta\mu_n$
   vii) Determining a grayness value for each pixel in each strip, adding $\Delta\bar{\mu}_k$ to each grayness value and then dividing that sum by $m_k$
   b) Convolving the image with at least one low pass filter;
   c) Displaying the filtered image.

2. The method of claim 1 wherein the filter has a substantially round configuration.

3. The method of claim 2 wherein the convolving is done by applying a sequence of filters a first filter having an area of known value and successive filters having areas about twice, about three times and about four times the area of the first filter.

4. The method of claim 1 also comprising the step of convolving the filtered image with a spatial differentiation filter comprised of a matrix having a single row and a number of columns equal to a number of columns in the low pass filter with which the image has been convolved.

5. The method of claim 4 wherein the filter is of the form [−1 0 . . . 0 1], if the image is to the left of the vehicle's path.

6. The method of claim 4 wherein the filter is of the form [1 0 . . . 0 −1], if the image is to the right of the vehicle's path.

7. The method of claim 1 also comprising the step of identifying those filters which yield a reasonable number of detections and selecting for convolving the image one of the identified filters which has a lowest frequency.

8. The method of claim 7 wherein the filter is selected by
   a) solving for each filter under consideration the equation $$ln(FA) = K_o + K_1 \sigma \text{ wherein}$$

FA is a number of false alarms per 100,000 pixels
   $\sigma$ is a number of standard deviations from a mean
   $K_o$ and $K_1$ are data points from a graph corresponding to the selected low pass filter; and
   b) selecting that filter which provides an acceptable number of false alarms.

9. The method of claim 1 also comprising the step of comparing the image after filtering with a second image to determine if the image matches the second image.

10. The method of claim 9 wherein the comparison is done visually.

11. The method of claim 9 wherein the comparison is done by computer using a matching algorithm.

12. A method for matching two images each comprised of points which points each have a valve corresponding to a grayness level comprising the steps of:
   a) creating a first matrix $\{P\}$ containing values $p_i$ corresponding to a grayness level of all points in a first image;
   b) creating a second matrix $\{Q\}$ containing values $q_j$ corresponding to a grayness level of all points in a second image;
   c) creating a matrix $\{P_i, Q_j\}$ of pairs of points from the first image and the second image;
   d) assigning each pair of points in matrix $\{P_i, Q_j\}$ a score determined by combining the grayness level of the points thereby creating a set of scores $\{S_k\}$;
   e) selecting and ranking those pairs of points having a score greater than a predetermined value to create a set of selected pairs $\{P_h, Q_k\}$;
   f) choosing a selected pair of points $\{p_1, q_1\}$ as a centroid;
   g) finding another pair of points $\{p_2, q_2\}$ such that a distance between $p_1$ and $p_2$ is a minimum of all distances between points $p_i$ in the set of selected pairs $\{P_h, Q_k\}$;
   h) determining a distance d between points $q_1$ and $q_2$;
   i) calculating a value x from the equation $x = d^2/r^2$ wherein r is a preselected factor;
   j) determining a $\Delta s$ from the equation $$\Delta s = \frac{1}{1 + x + \frac{1}{2} x^2}$$

k) adding $\Delta s$ to score corresponding to the selected pair of points $(p_i, q_i)$;

l) choosing additional selected pairs of points;

m) repeating steps h thru k for each additional selected pairs of points thereby creating a set of new scores $\{S_m\}$ for the chosen pairs of points;

n) selecting those scores from set $\{S_m\}$ which are greater than a predetermined threshold and declaring a match among the pairs of points which corresponding to the selected scores;

o) creating a new set of $\{P_i, Q_m\}$ pairs of points containing those pairs of points selected in step n;

p) selecting from set $\{P_i, Q_m\}$ those pairs of points having a common translation to form a new set;

q) using the common translation to match other points in the first image with points in the second image; and r) displaying the first image and the second image in a manner to allow a reader to see how the images match.

13. The method of claim 12 wherein the images are displayed side-by-side and a line is drawn between at least one point in the first image to a matching point in the second image;

14. The method of claim 12 wherein the images are displayed by overlaying at least a portion of the two images such that points in the first image are on top of matching points in the second image.

15. The method of claim 12 wherein the images are sonar images.

16. The method of claim 12 also comprising the step of calculating a new $\Delta s$ after each score by averaging all values of $\Delta s$ previously calculated.

17. The method of claim 12 also comprising the steps of a) computing a translation needed to align points within the set $\{P_m, Q_n\}$;

b) choosing a set of points $\{R\}$ from the first images;

c) applying the translation computed in step a to the points in set $\{R\}$ d) selecting a set of points $\{S\}$ from the second image;

e) creating a set of pairs of points $\{R_i, S_j\}$ having close grayness levels;

f) choosing a pair of points $(r_1, s_1)$ from $\{R_i, S_j\}$ as a centroid;

g) finding another pair of points $(r_2, s_2)$ from $\{R_i, S_j\}$ such that a distance between $r_1$ and $r_2$ is a minimum of all distances between points $r_i$ in the set $\{R_i, S_j\}$;

h) determining a distance d between points $r_1$ and $r_2$ i) calculating a value x from the equation $x = d2/r2$ wherein r is a preselected factor;

j) determining a $\Delta s$ from the equation $$\Delta s = \frac{1}{1 + x + \frac{1}{2} x^2}$$

k) adding $\Delta s$ to the score corresponding to the pair $(p_1, q_1)$;

l) choosing additional pairs of points from the set $\{R_i, S_j\}$;

m) choosing additional point pairs from set $\{R_i, S_j\}$ n) repeating steps h thru k for each additional selected pair of points thereby creating a set of new scores $\{S_m\}$ for the chosen pair of points;

o) selecting those scores from set $\{S_m\}$ which are greater than a predetermined threshold; and p) identifying on at least one image at least one point among the pairs of points which correspond to the selected scores.

18. A method of side-scan navigation to determine position and course of a vehicle having a navigation system comprising the steps of a) making at least two passes during which sonar is operated to create a selected sonar image and a second sonar image;

b) creating a first matrix $\{P\}$ containing values $P_i$ corresponding to a grayness level of all points in a first image;

c) creating a second matrix $\{Q\}$ containing values $q_j$ corresponding to a grayness level of all points in a second image;

d) creating a matrix $\{P_i, Q_j\}$ of pairs of points from the first image and the second image;

e) selecting and ranking those pairs of points having a score greater than a predetermined value to create a set of selected pairs $\{P_h, Q_k\}$;

f) choosing a selected pair of points $\{p_1, q_1\}$ as a centroid;

g) finding another pair of points $\{p_2, q_2\}$ such that a distance between $p_1$ and $p_2$ in the set of selected pairs $\{P_h, Q_k\}$;

h) determining a distance d between points $q_1$ and $q_2$;

i) calculating a value x from the equation $x = d^2/r^2$ wherein r is a preselected factor;

j) determining a $\Delta s$ from the equation $$\Delta s = \frac{1}{1 + x + \frac{1}{2} x^2}$$

k) adding $\Delta s$ to score corresponding to the selected pair of points $(p_i, q_i)$;

l) choosing additional selected pairs of points;

m) repeating steps h thru k for each additional selected pairs of points thereby creating a set of new scores $\{S_m\}$ for the chosen pairs of points;

n) selecting those scores from set $\{S_m\}$ which are greater than a predetermined threshold and declaring a match among the pairs of points which corresponding to the selected scores;

o) creating a new set of $\{P_n, Q_m\}$ pairs of points containing those pairs of points selected in step n;

p) selecting from set $\{P_n, Q_m\}$ those pairs of points having a common translation to form a new set;

q) using the common translation to match other points in the first image with points in the second image; and r) updating positions of the vehicle and objects in the navigation system of the vehicle from the translation.

19. The method of claim 18 wherein state estimation techniques are used to update positions of the vehicle.

* * * * *